United States Patent [19]

Popov et al.

[11] 4,249,114
[45] Feb. 3, 1981

[54] ELECTROMECHANICAL ENERGY CONVERTER

[76] Inventors: Alexandr D. Popov, pereulok Rynochny, 44; Vladimir A. Solomin, ulitsa Dachnaya, 14, kv. 31, both of Rostov-na-Donu; Vladimir A. Trofimov, selo Balakleya, pereulok Tikhy, 8, Cherkasskaya oblast; Alexandr I. Mishkovich, RIIZhT, 5, kv. 21, Rostov-na-Donu; Vyacheslav A. Ponomarev, ulitsa Privokzalnaya, 23, kv. 11, Azov; Sergei I. Leschen, ulitsa Lermontovskaya, 125/135, kv. 64, Rostov-na-Donu, all of U.S.S.R.

[21] Appl. No.: 1,417

[22] Filed: Jan. 8, 1979

[30] Foreign Application Priority Data

Mar. 20, 1978 [SU] U.S.S.R. ................ 2587752

[51] Int. Cl.³ ............................ H02K 41/00
[52] U.S. Cl. ...................... 318/115; 318/135; 310/13
[58] Field of Search ............ 318/115, 135, 37, 38; 310/12, 13

[56] References Cited

U.S. PATENT DOCUMENTS

| | | | |
|---|---|---|---|
| 3,497,730 | 2/1970 | Doolittle | 310/13 |
| 3,761,747 | 9/1973 | Allaigre | 310/13 |
| 3,801,840 | 4/1974 | Kant | 310/13 |
| 4,131,813 | 12/1978 | Delassus | 310/13 |

*Primary Examiner*—Donovan F. Duggan
*Attorney, Agent, or Firm*—Steinberg & Raskin

[57] ABSTRACT

An electromechanical energy converter comprises a linear induction motor and a switching assembly. The linear induction motor includes an inductor formed of individual transversal laminations with windings and a secondary element. The transversal laminations are provided with slots and the winding of each transversal lamination is a distributed winding having sections connected to the switching assembly which either connects the winding of one transversal lamination to one phase of an a.c. power source and the windings of the subsequent laminations to the other phases thereof or connects the winding of each transversal lamination to all phases of the a.c. power source. This invention permits a longitudinal or transversal movement of the inductor and uniform transversal distribution of a magnetizing force within an air gap between the inductor and secondary element.

1 Claim, 4 Drawing Figures

4,249,114

ELECTROMECHANICAL ENERGY CONVERTER

FIELD OF THE INVENTION

This invention relates to electrical machines and in particular to electromechanical energy converters.

It may also find application with high-speed ground transport systems, conveyer installations, face grinding machines and also with various power drives wherein working members perform a rectilinear or reciprocating motion.

DESCRIPTION OF THE PRIOR ART

Known in the art is an electromechanical energy converter (cf. British Pat. No. 1,316,131 Cl. H2A, 1973) comprising a linear induction motor including an inductor formed of transversal laminations interconnected by means of longitudinal laminations and having a winding arranged thereon, and a secondary element having an electrically conductive part arranged on a magnetically conductive base.

The aforesaid electromechanical energy converter permits only a longitudinal movement of the inductor and nonuniform transversal distribution of a magnetizing force within an air gap between the inductor and secondary element.

Another prior art electromechanical energy converter (cf. British Pat. No. 1,314,161 Cl. H2A, 1973) comprises a linear induction motor having an inductor formed of individual inverted U-shape transversal laminations with windings arranged thereon and a secondary element including an electrically conductive part arranged on a magnetically conductive base. An air gap is provided between the inductor and the secondary element. The winding of one transversal lamination is connected to one phase of an a.c. power source, whereas the windings of the subsequent transversal laminations are connected to the other phases thereof so as to form a direct phase rotation.

The aforesaid electromechanical energy converter permits only a longitudinal movement of the inductor.

Furthermore, transversal distribution of a magnetizing force within the air gap between the inductor and secondary element is nonuniform.

SUMMARY OF THE INVENTION

It is an object of the present invention to provide an electromechanical energy converter permitting a longitudinal or transversal movement of an inductor.

Another object of the invention is to provide an electromechanical energy converter permitting uniform transversal distribution of a magnetizing force within an air gap between an inductor and a secondary element.

The foregoing objects are accomplished by that in an electromechanical energy converter comprising a linear induction motor having an inductor formed of individual transversal laminations with windings and a secondary element including an electrically conductive part arranged on a magnetically conductive base, wherein the winding of one transversal lamination is connected to one phase of an a.c. power source and the windings of the subsequent laminations are connected to the other phases thereof, according to the invention, provision is made for a switching assembly and the transversal laminations have slots the number of which in each transversal lamination is at least twelve, the winding of each transversal lamination being a distributed winding having at least six sections each of which is connected to the switching assembly which switches the winding of each transversal lamination connecting it to all phases of the a.c. power source.

This invention enables a transversal or longitudinal movement of the inductor, which opens up a wider field of application for the herein proposed electromechanical energy converter. Furthermore, uniform transversal distribution of a magnetizing force within the air gap between the inductor and secondary element increases efficiency and power factor of the electromechanical energy converter.

DESCRIPTION OF DRAWINGS

The invention will now be described in greater detail with reference to a specific embodiment thereof, taken in conjunction with the accompanying drawings, wherein.

DESCRIPTION OF THE INVENTION

Figure 1:
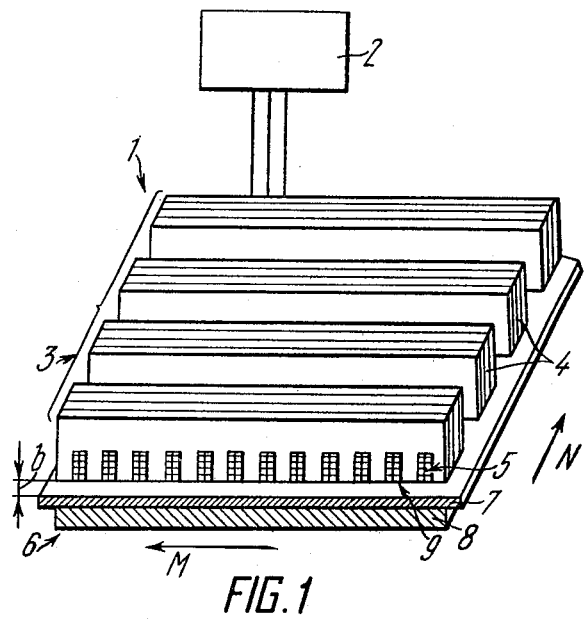
FIG. 1 is a general view of an electromechanical energy converter according to the invention.

The electromechanical energy converter forming the subject of the present invention comprises a linear induction motor 1 (FIG. 1) and a switching assembly 2.

The linear induction motor 1 includes an inductor 3 formed of individual transversal laminations 4 each of which carries a winding 5, and a secondary element 6 having an electrically conductive part 7 arranged on a magnetically conductive base 8. An air gap $\delta$ is provided between the inductor 3 and the secondary element 6.

The transversal laminations 4 are provided with slots 9 (at least twelve slots in each transversal lamination 4 in a preferred embodiment of the invention). The winding 5 of each transversal lamination 4 is a distributed winding having six sections 10 (FIG. 2), 11, 12, 13, 14 and 15 enclosed within the slots 9 (FIG. 1) of the transversal laminations 4. Each of the sections 10 (FIG. 2), 11, 12, 13, 14 and 15 of the winding 5 is connected to respective contacts 16, 17, 18, 19, 20, 21, 22, 23, 24, 25, 26 and 27 of the switching assembly 2 such, for example, as a relay by means of which the winding 5 is connected to phases A, B and C of a three-phase a.c. power source.

Figure 2:
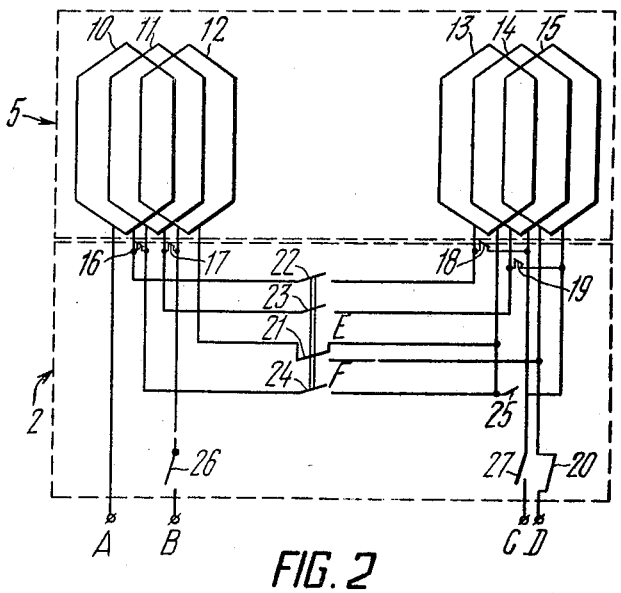
FIG. 2 illustrates connection of winding sections of one transversal lamination to a switching assembly according to the invention.

FIG. 2 illustrates connection of the sections 10 (FIG. 2), 11, 12, 13, 14 and 15 of the winding 5 of one transversal lamination 4 (FIG. 1) to the switching assembly 2. The notations used in FIG. 2 denote the following:
D—neutral point of the three-phase power source;
E—normally-closed position of the contact 21; and
F—normally-open position of the contact 21.

Figure 3:
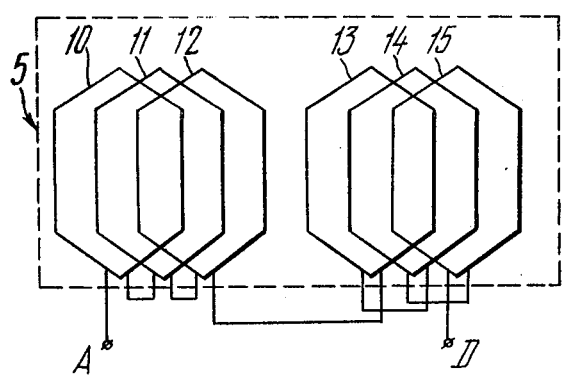
FIG. 3 shows one-phase connection of winding sections of one transversal lamination according to the invention.

To enable a longitudinal movement of the inductor 3 (FIG. 1), for example, along the arrow N, the sections 10 to 15 (FIG. 3) of the winding 5 of one transversal lamination 4 (FIG. 1) are connected to one phase, for example, to phase A (FIG. 3) of the three-phase a.c. power source, whereas the sections 10 to 15 of the windings 5 of the subsequent transversal laminations 4 (FIG. 1) are connected to the other phases of the three-phase a.c. power source so as to form in a longitudinal direction along the arrow N a direct phase rotation within the windings 5.

Figure 4:
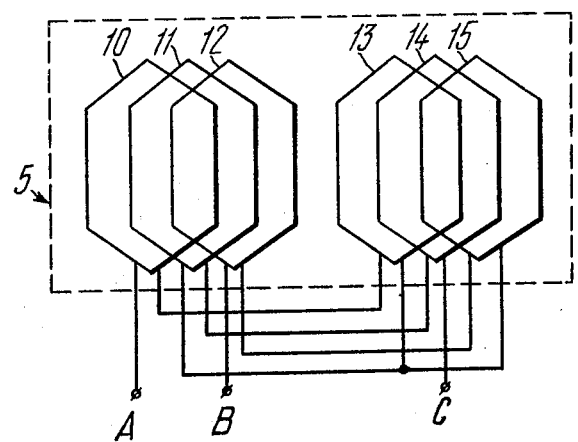
FIG. 4 shows three-phase connection of winding sections of one transversal lamination according to the invention.

To enable a transversal movement of the inductor 3, for example, along the arrow M, the sections 10 to 15 (FIG. 4) of the winding 5 of each transversal lamination are connected to phases A (FIG. 4), B and C of the three-phase a.c. power source so as to form a direct phase rotation within the windings 5 in a transversal direction. The sections 10 and 13 are connected to phase A, the sections 12 and 15 to phase B, and the sections 14 and 11 to phase C, the winding 5 (FIG. 1) of each transversal lamination 4 being connected in star.

The electromechanical energy converter forming the subject of the present invention operates as follows.

To enable a longitudinal movement of the inductor 3 (FIG. 1) of the linear induction motor 1, for example, along the arrow N, the sections 10 to 15 (FIG. 3) of the winding 5 of one transversal lamination 4 (FIG. 1) are star-connected to one phase of the three-phase a.c. power source, the sections 10 to 15 (FIG. 3) being connected in series, whereas the section 10 is connected to phase A and the section 15 to the neutral point D of the three-phase a.c. power source. The circuit is completed through the normally-closed contacts 16 (FIG. 2), 17, 18, 19 and 20, while the contact 21 is at E. The other contacts of the relay are open. (Relay coil is not shown in the drawings).

The windings 5 (FIG. 1) of the contiguous transversal laminations 4 are connected to the other phases of the three-phase a.c. power source in a similar manner so as to form in a longitudinal direction of inductor 3 movement a direct phase rotation within the windings 5.

This sets up a magnetic field travelling along the arrow N and crossing the electrically conductive part 7 of the secondary element 6 with the result that electromotive forces are induced therein. Eddy currents induced within the electrically conductive part 7 of the secondary element 6 under the action of the aforesaid electromotive forces interact with the travelling magnetic field of the inductor 3 of the linear induction motor 1 whereby a tractive force causing the inductor 3 to move longitudinally with respect to the secondary element 6 will be set up.

To enable a transversal movement of the inductor 3 of the linear induction motor 1, for example, along the arrow M, the sections 10 to 15 (FIG. 4) of the winding 5 of one transversal lamination 4 (FIG. 1) are connected in star and coupled to phases A (FIG. 4), B and C of the three-phase a.c. power source, the section 10 being connected to phase A, the section 12 to phase B, and the section 14 to phase C.

As this happens, the contacts 16 (FIG. 2), 17, 18, 19 and 20 are opened, the contact 21 is set F, while the contacts 22, 23, 24, 25, 26 and 27 are closed. The windings 5 (FIG. 1) of the other transversal laminations 4 of the inductor 3 are connected as the winding 5 of one transversal lamination 4. Such a connection sets up magnetic fields travelling in a transverse direction and inducing electromotive forces within the electrically conductive part 7 of the secondary element 6, which induce eddy currents within the electrically conductive part 7. The currents thus induced interact with the magnetic fields travelling in a transverse direction, which have been set up by the transversal laminations 4 with the windings 5. As a result, tractive forces causing the inductor 3 to move in a transverse direction will be set up. Since the windings 5 of the transversal laminations 4 are distributed windings, uniform transversal distribution of a magnetizing force will be provided within the air gap between the inductor 3 and the secondary element 6.

The electromechanical energy converter forming the subject of the present invention enables a transversal or longitudinal movement of the inductor and uniform transversal distribution of a magnetizing force within the air gap between the inductor and the secondary element of the linear induction motor.

What is claimed is:

1. An electromechanical energy converter connected to an a.c. power source and comprising:
 a linear induction motor;
 a switching assembly;
 an inductor of said linear induction motor;
 transversal laminations of said inductor of said linear induction motor; slots in each of said transversal laminations of said inductor of said linear induction motor, the number of said slots in each of said transversal laminations being at least twelve;
 distributed windings arranged on said transversal laminations of said inductor of said linear induction motor; sections of said distributed windings connected to said switching assembly; each of said distributed windings having at least six said sections;
 said distributed winding of each of said transversal laminations of said inductor of said linear induction motor, connected to said switching device connecting it to all phases of said a.c. power source to enable a transversal movement and switching, to enable a longitudinal movement, said distributed windings so as to connect one of said distributed windings of one of said transversal laminations to one phase of the a.c. power source and said distributed windings of subsequent said transversal laminations to the other phases of said a.c. power source;
 a secondary element of said linear induction motor;
 a magnetically conductive base of said secondary element of said linear induction motor;
 an electrically conductive part of said secondary element of said linear induction motor arranged on said magnetically conductive base of said secondary element of said linear induction motor.

\* \* \* \* \*